(12) United States Patent
Sakai

(10) Patent No.: US 6,594,040 B1
(45) Date of Patent: Jul. 15, 2003

(54) THERMAL TRANSFER FACSIMILE APPARATUS

(75) Inventor: Katsuyuki Sakai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/336,599

(22) Filed: Jun. 21, 1999

(30) Foreign Application Priority Data

Aug. 19, 1998 (JP) ............................................. 10-232799

(51) Int. Cl.$^7$ .............................. H04N 1/04; H04N 1/40; H04N 1/024; H04N 1/23
(52) U.S. Cl. .................... 358/498; 358/496; 358/474; 358/471; 358/472; 358/296; 358/297
(58) Field of Search ............................... 358/498, 496, 358/474, 471, 472, 296, 297

(56) References Cited

U.S. PATENT DOCUMENTS

| | | | |
|---|---|---|---|
| 4,754,337 A | * | 6/1988 | Nohtomi et al. ............ 358/401 |
| 4,910,602 A | * | 3/1990 | Sakuragi .................... 347/215 |
| 4,914,525 A | * | 4/1990 | Abe et al. .................... 292/109 |
| 5,917,533 A | * | 6/1999 | Suzuki et al. ............... 347/214 |

FOREIGN PATENT DOCUMENTS

JP          A9 214649          8/1997

* cited by examiner

Primary Examiner—Edward Coles
Assistant Examiner—Houshang Safaipour
(74) Attorney, Agent, or Firm—Birch, Stewart, Kolasch & Birch, LLP

(57) ABSTRACT

A thermal transfer facsimile apparatus of the type having a transmitting system disposed above a recording system, which construction is compact and allows a user to open a body cover to remove a document jammed in the apparatus with no fear of damaging the document. In the apparatus, a part of an ink-ribbon cartridge serves as a lower guide for supporting a document to be transported, while a part of the body cover, to which a platen and rollers for feeding and delivering recording paper are attached, also serves as a lower guide for the document. When a body cover is opened to replace an ink ribbon with new one or remove a document jammed in the apparatus, a distance formed between a document feeding roller fixed to the body and a lower free end of the body cover is so elongated by virtue of the existence of the guiding part of the cartridge that document may be gently curved and stretched therebetween without being damaged. This can also assure a compact design of the apparatus.

7 Claims, 5 Drawing Sheets

THERMAL TRANSFER FACSIMILE APPARATUS

FIELD OF THE INVENTION

The present invention relates generally to thermal transfer facsimile apparatuses and, more particularly, to a compact facsimile apparatus of that type, which has an improved internal construction enabling reduction of the size of apparatus and allowing a user to easily remove a document jammed therein during transmission operation with no fear of damaging the document by opening its body cover.

BACKGROUND OF THE INVENTION

With the wide spread of facsimile apparatuses in replace of conventional telephone sets, there has arisen a keen requirement for facsimile apparatuses that are more compact and can be installed at a reduced surface area in particular. Thermal transfer facsimile apparatuses are apt to have an increased size because of its complicated construction. Many facsimile apparatuses of that type are designed in such a way that a transmitting system is arranged above a recording system to reduce their installation size.

FIG. 1 schematically illustrates a typical construction of a thermal transfer facsimile apparatus wherein a transmitting system is disposed above a recording system. In FIG. 1, the recording system consists of an ink ribbon 1, ink ribbon cartridge 2', a thermal head 3, a platen 5, a recording paper feeding roller 10 and a recording paper delivering roller 11. The transmitting system consists of a body cover 4' also serving as a lower guide for an original document, a document feeding roller 6, a document transporting roller 7, a scanner unit 8 and an operation panel 9.

As shown in FIG. 1, a top cover of the recording system, which is a part of the body cover 4' and also serves as a lower guide for document, can be flapped up to open. The document feeding roller 6 is fixed to the body and can be separated from the top cover being opened. This design concept has been adopted to meet the space and cost saving requirements.

In the thus constructed facsimile apparatus, there may happen stopping or jamming of an original document to be fed and read for transmission. In this case, the document may usually be removed by making first it free from engagement with the document feeding and delivering rollers 6 and 7 by using releasing mechanisms provided at the rollers and then by pulling the end of the document from the outside of the apparatus.

However, there may be a case that the document cannot be pulled by its end because of its shortness and therefore requires opening the body cover 4'. The body cover 4' may also be opened by a user not being aware of existence of a document in the apparatus.

FIG. 2 shows the same facsimile apparatus (of FIG. 1) with its body cover in its open state. In this instance, the document may be damaged, being strongly pinched between the document feeding roller 6 and the body cover 4'.

Means for lessening stress of pinching a document (i.e., preventing the document from being sharply bent) are to provide a longer distance between the document feeding roller 6 and the front free end of the body cover 4'.

FIG. 3 shows an exemplified construction of a facsimile apparatus, which is featured by an increased distance between the document feeding roller and the front free end of the body cover 4'. As shown in FIG. 3, this design feature necessarily increases the length of the apparatus because of the need for providing a space allowing a user to replace an ink-ribbon cartridge with new one. This is incompatible with miniaturization of a facsimile apparatus.

SUMMARY OF THE INVENTION

It is the main object of the present invention is to provide a thermal transfer facsimile apparatus that is compact and, at the same time, is free from such a drawback that an original document is sharply bent or strongly pinched to be damaged when a body cover 4 is open to remove the jammed document or treat with any other trouble.

More specifically, it is an object of the present invention is to provide a thermal transfer facsimile apparatus having a unique construction in which a part of an ink-ribbon cartridge is used as a part of a guide for guiding the underside of a document and can be set at a position where a document may not be damaged when the body cover is open. This design solution can also meet the need for compactness of the facsimile apparatus.

Another object of the present invention is to provide a thermal transfer facsimile apparatus having a transmission system disposed above a recording system and a body cover movable to open for maintenance, wherein a part of an ink-ribbon cartridge is used as at least a part of a lower guide for guiding the underside of a document to be read for transmission.

Still another object of the present invention is to provide a thermal transfer facsimile apparatus, wherein a part of an ink-ribbon cartridge is used as a part of a lower guide for guiding the underside of a document and extends to a position where it cannot prevent rotational movement of a recording paper-feeding mechanism attached to a body cover.

Still another object of the present invention is to provide a thermal transfer facsimile apparatus wherein a lower document guide is formed by a part of a body cover and a part of an ink-ribbon cartridge and the body cover portion is disposed at the upstream side above the cartridge portion along the document transporting path in such a way that a line representing a document between the free end of the body cover in its open state and a document feeding roller secured to the body may have a gentle slope.

PREFERRED EMBODIMENT OF THE INVENTION

Figure 4:
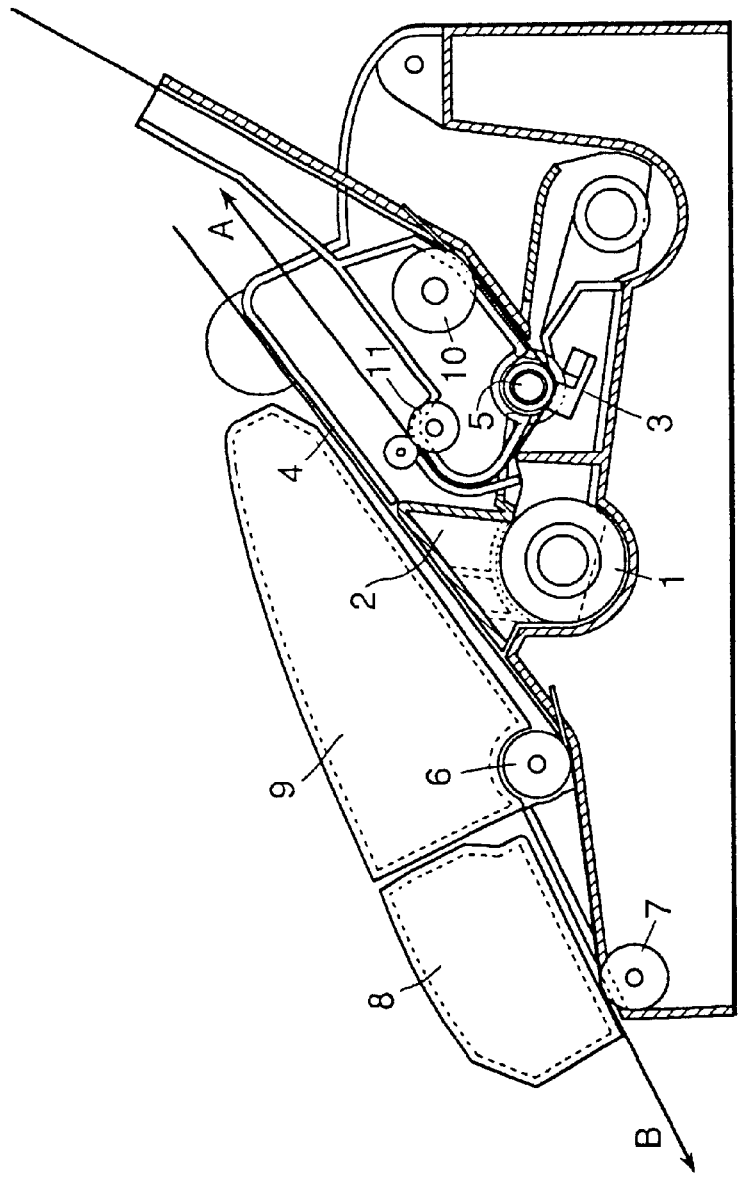
FIG. 4 is a schematic view of an exemplified construction of a thermal transfer facsimile apparatus having a transmitting system arranged above a recording system, which is an embodiment of the present invention.

Referring to accompanying drawings, a thermal transfer facsimile apparatus embodying the present invention will be described as follows:

FIG. 4 schematically shows an exemplified construction of a thermal transfer facsimile apparatus according to the present invention, in which a transmitting system is arranged above a recording system. As shown in FIG. 4, the recording system is composed of an ink ribbon 1, an ink-ribbon cartridge 2 partly acting as a document guide, a thermal recording head 3, platen 5, a recording paper feeding roller 10, a recording paper delivering roller 11 and the transmitting system is composed of a body cover 4 partly acting as a document guide, a document feeding roller 6, a document transporting roller 7, a scanner unit 8 and an operation panel 9.

In the shown embodiment, the body cover 4 can be open and shut and serves as a guide for guiding the lower surface of a document and as an upper cover of the recording system. This cover is provided with the platen 5, the recording paper feeding roller 10 and the recording paper delivering roller 11 of the recording system. The recording paper is transported along a path shown by an arrow A in FIG. 4. The document feeding roller 6 for transporting an original document to a reading portion formed by a scanner unit 8, the document transporting roller 7 for transporting the document gradually by a specified distance and the scanner unit 8 for reading the document are all secured onto the apparatus body. The document is transported along a path shown by an arrow B in FIG. 4.

One of essential features of the shown apparatus exists in that an ink-ribbon cartridge 2 holding an ink ribbon 1 wound around a drum can also support by a part of its casing a document being fed to the scanner unit 8 by the document feeding roller 6.

As shown in FIG. 4, the lower document guide is formed by the part of the ink-ribbon cartridge 2 and a part of the body cover 4 that can also serve as a top cover for the recording system of the apparatus (according to the conventional method). Consequently, the document guiding portion of the body cover 4, which also serves as the top cover of the recording system, may have a shorter length in comparison with a conventional apparatus shown in FIG. 4. This is another essential point featuring the apparatus according to the present invention.

Figure 1:
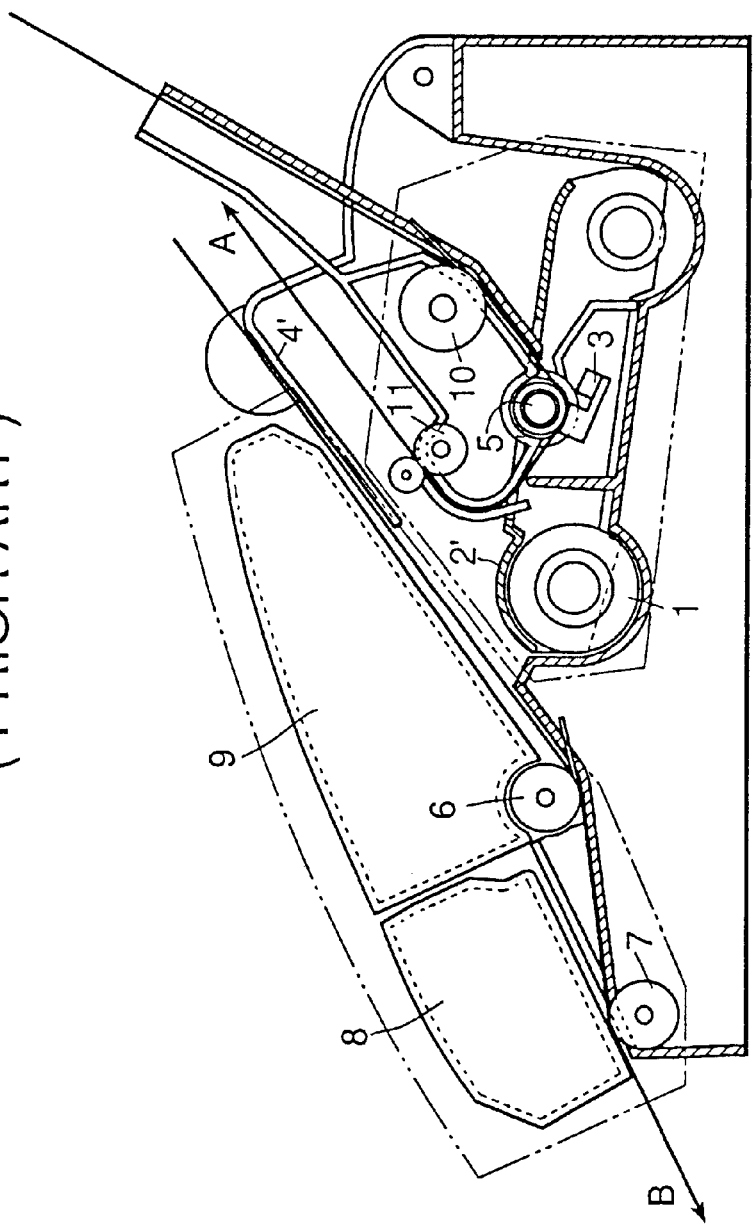
FIG. 1 is a schematic view of a typical construction of a conventional thermal transfer facsimile apparatus.
Figure 2:
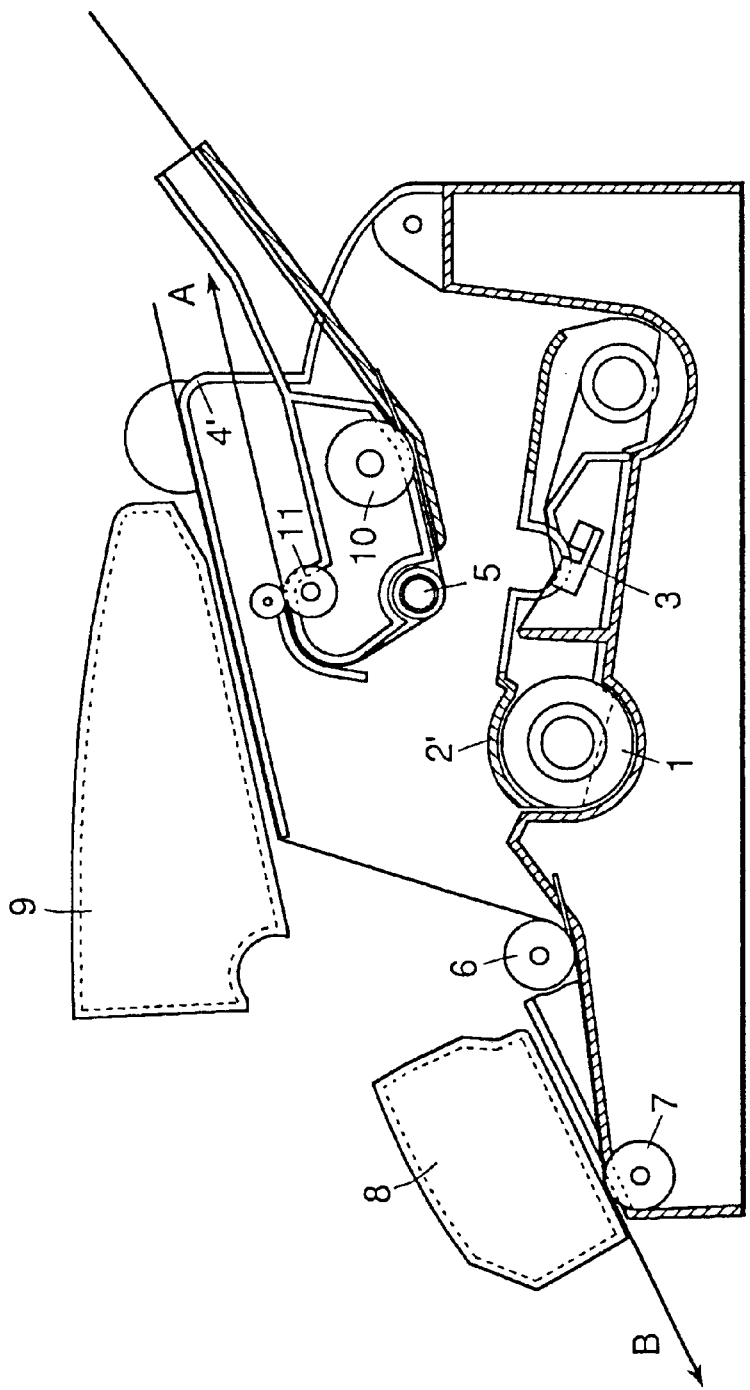
FIG. 2 shows the facsimile apparatus of FIG. 1 when its body cover is open.
Figure 3:
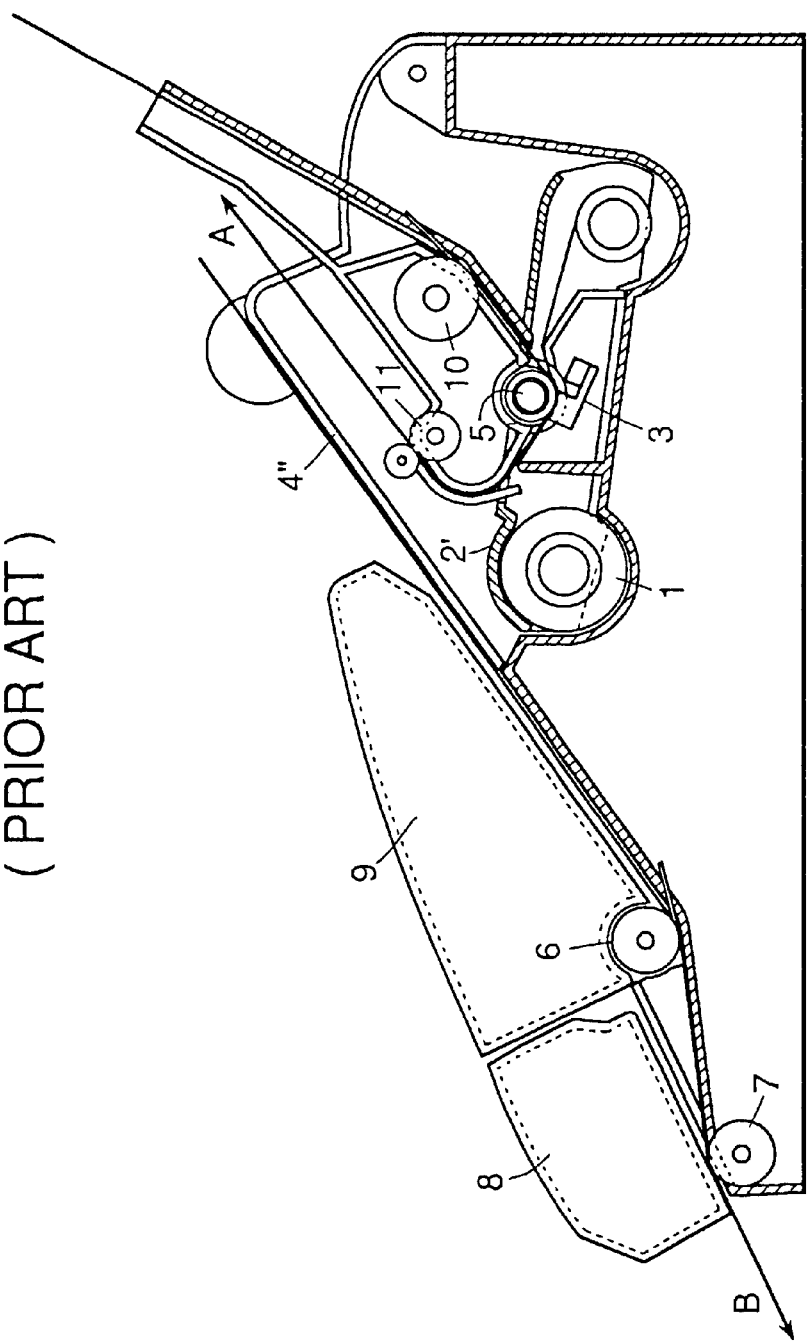
FIG. 3 shows an exemplified modification of the apparatus of FIG. 1, in which a distance between a document feeding roller and a body cover has been elongated.
Figure 5:
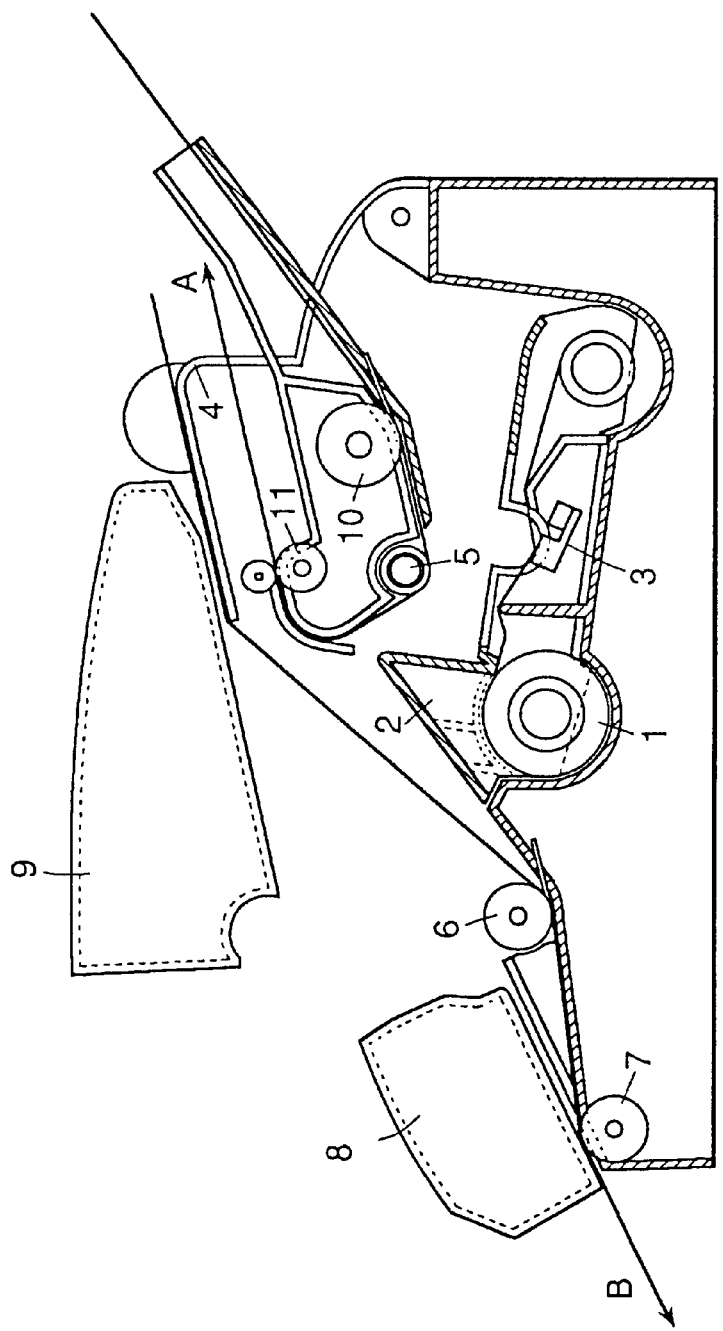
FIG. 5 shows the facsimile apparatus of FIG. 4 when its body cover is open.

The body cover 4 serving both as a part of the lower document guide and the top cover of recording system can be opened and shut. The apparatus with the body cover being open is shown in FIG. 5. In the shown embodiment, the document feeding roller 6 is fixed to the body of the apparatus to save spacing and reduce a cost of manufacturing the apparatus. Therefore, the document feeding roller 6 can be separated from the body cover 4 when the cover is opened. (This is the same as the conventional device of FIGS. 1 and 2).

According to the above embodiment of the present invention, it is possible to secure a long distance between the feeding roller 6 and the free front end of the body cover 4 when the cover is opened as shown in FIG. 5 for removing a document jammed in the apparatus or for the other purpose by virtue of the fact that a portion of the ink-ribbon cartridge 2 also serves as a part of the lower guide for supporting the underside of a document. Consequently, the document can be gently curved between the document feeding roller 6 and the open body cover without being strongly pinched or sharply bent. In other words, the apparatus can protect a document from being damaged as experienced in the conventional apparatuses. Furthermore, this is realized with no increase in size of the apparatus.

As described above, a facsimile apparatus according to the present invention can provide an elongated distance between a document feeding roller and a body cover by interposing therein a part of the ink ribbon cartridge as a part of a lower document guide, which realizes a compact construction of the apparatus and effectively protects the document from being damaged, i.e., strongly pinched or sharply bent when the body cover is opened for removing the document jammed in the apparatus or eliminating any other trouble.

What is claimed is:

1. A thermal transfer facsimile apparatus: comprising:

a transmitting system disposed above a recording system and having a body cover movable to open for operation and maintenance operation, an ink-ribbon cartridge having a top surface which extends solely in a single longitudinal direction, the top surface is used as at least a part of a lower guide for supporting the under surface of a document to be read and transmitted.

2. The thermal transfer facsimile apparatus as defined in claim 1, wherein a part of the ink-ribbon cartridge, which serves as a part of the lower guide, extends to a position where it cannot interfere a rotational movement of a recording paper feeding mechanism integrally attached to the body cover being in its open state.

3. A thermal transfer facsimile apparatus of the type having a transmitting system disposed above a recording system and having a body cover movable to open for operation and maintenance operation, wherein a part of an ink-ribbon cartridge is used as at least a part of a lower guide for supporting the under surface of a document to be read and transmitted;

wherein a part of the body cover is used as a part of the lower guide for supporting the under surface of the document, which guide part is positioned at an upper stream side from the lower guide part formed by a part of the ink-ribbon cartridge along a document transporting path and has, when the body cover is opened, a preset upper position where a line from a lower free end of the lower guide part formed by the part of the body cover toward a document feeding roller secured to the apparatus body has a gentle slope.

4. A thermal transfer facsimile apparatus of the type having a transmitting system disposed above a recording system and having a body cover movable to open for operation and maintenance operation, wherein a part of an ink-ribbon cartridge is used as at least a part of a lower guide for supporting the under surface of a document to be read and transmitted;

a part of the ink-ribbon cartridge, which serves as a part of the lower guide, extends to a position where it cannot interfere a rotational movement of a recording paper feeding mechanism integrally attached to the body cover being in its open state;

wherein a part of the body cover is used as a part of the lower guide for supporting the under surface of the document, which guide part is positioned at an upper stream side from the lower guide part formed by a part of the ink-ribbon cartridge along a document transporting path and has, when the body cover is opened, a preset upper position where a line from a lower free end of the lower guide part formed by the part of the body cover toward a document feeding roller secured to the apparatus body has a gentle slope.

5. The thermal transfer facsimile apparatus of claim 1, wherein the top surface is effective to contact a substantial portion of the undersurface when the undersurface is directly above the top surface.

6. The thermal transfer facsimile apparatus of claim 1, wherein the top surface is flat.

7. The thermal transfer facsimile apparatus of claim 5, wherein the top surface is flat.

* * * * *